(No Model.)
W. A. KROUSE.
MANUFACTURE OF AND MOLD FOR MAKING CUSPIDORS, &c.
No. 286,830. Patented Oct. 16, 1883.
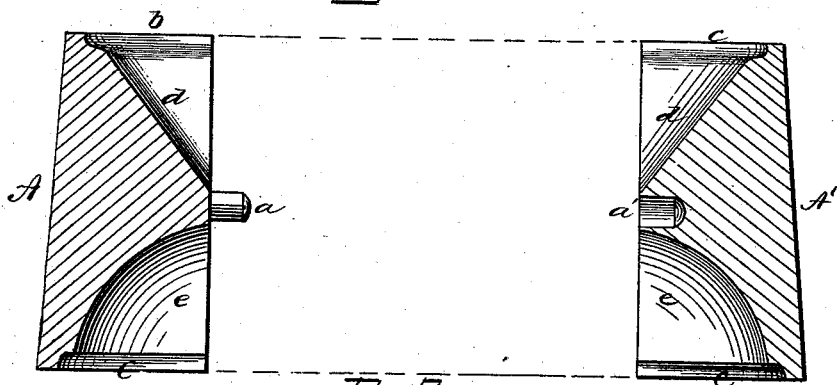
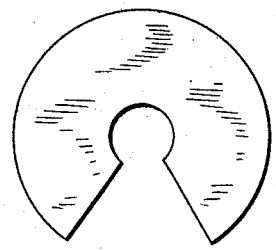
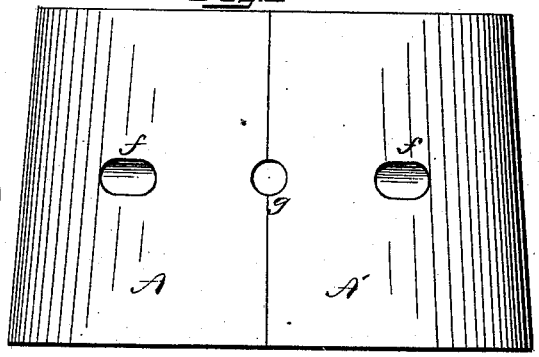
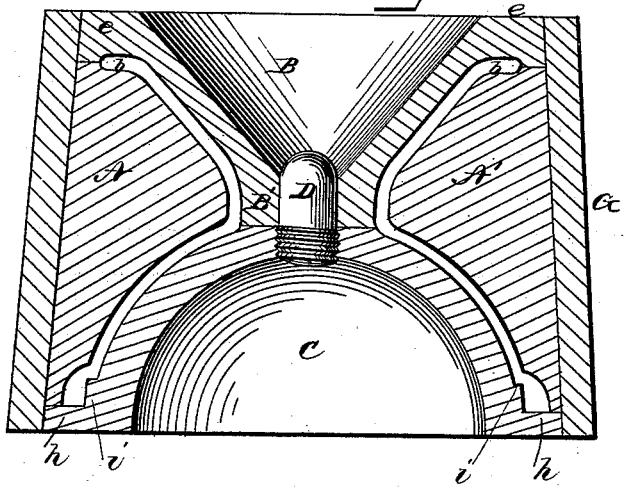
WITNESSES
F. L. Ourand,
Wm A Garner.
INVENTOR
William A. Krouse,
by L. Deane.
his Attorney

UNITED STATES PATENT OFFICE.

WILLIAM A. KROUSE, OF WILLIAMSPORT, PENNSYLVANIA.

MANUFACTURE OF AND MOLD FOR MAKING CUSPIDORS, &c.

SPECIFICATION forming part of Letters Patent No. 286,830, dated October 16, 1883.

Application filed June 29, 1883. (No model.)

*To all whom it may concern:*

Be it known that I, WILLIAM A. KROUSE, a citizen of the United States, residing at Williamsport, in the county of Lycoming and State of Pennsylvania, have invented certain new and useful Improvements in the Manufacture of Cuspidors and Similar Articles and the Molds for Making the Same; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 is a diametrical section of the divisible or two-part mold separated. Fig. 2 is a side elevation of the two-part mold, showing the apertures for receiving an instrument for separating the same after casting a cuspidor. Fig. 3 is a diametrical section through the mold complete, showing a bottomless cuspidor cast or molded therein, with the coping or retaining-band in its place. Fig. 4 shows a pattern of one-half of a cuspidor before it is applied to the mold.

My object is to produce by a novel matrix a cuspidor entire—that is to say, without a seam or joint, and of rubber, vulcanized or otherwise, or of any analogous gum or other plastic material; and the nature of my invention consists in a sectional mold or matrix which is composed of several parts, which are so constructed that the flaring mouth, the breast, and the body of a cuspidor can be produced entire, as will be fully understood from the following description, when taken in connection with the annexed drawings.

A A' designate the body of the mold or matrix, which body is diametrically divided, and provided with a dowel-pin, *a*, and a recess, *a'*, therefor, for the purpose of closely uniting the halves. This body, when its two parts are together, is the exterior counterpart of the jointless and seamless cuspidor which it is my object to produce. At *b*, I form a rabbet, and at *c* another rabbet, which rabbets or recesses form the external ribs or re-enforces on the top and bottom of the cuspidors. These parts A A' are separable after the article is molded by simply introducing a suitable instrument into one or the other of the holes *f f* or *g* and tapping it with a hammer.

B designates an inverted frustum of a cone, having an annular flange, *e*, which is undercut to form in combination with the rabbet *b* on the sections A A' the bead around the upper edges of the cuspidors. The lower contracted apex of this section B of the mold is shaped to form in combination with the sections A A' the neck of a cuspidor, as clearly shown in Fig. 3 of the annexed drawings, and this contracted portion, which I now letter B', is adapted to receive tightly through it a plug, D, which is screwed into the center of the crown of a bottom section, C, of the mold. This bottom section, C, of the mold has a flange, *h*, at its lower base, above which is an annular rib, *i*, which, in combination with the rabbet *c* in the lower end of the sections A A', forms a rib on the cuspidor. The lower section, C, is dome-shaped, for the purpose of producing the breast of the cuspidor, and it is a single piece. This lower section affords a support closely jointed for the lower end of the neck of the upper section, B, of the mold, and by reason of its having a gain, *i*, around it, as shown in Fig. 3, the internal figure of the cuspidor is produced. Now, when the sections A A' and the sections B C are put together and a coping or band, G, is applied about them, they will be held in place.

It will be observed from the above description that I have a compound mold which is composed of divisible sections, all of which are so constructed and shaped that by the operation hereinafter explained I can produce at a single molding the flaring mouth, the neck, and the body of a cuspidor in a single piece without a seam or joint.

The operations are as follows: Into each side of the sections A A' is fitted strips of india-rubber or other plastic material cut in proper shape to form the article in question. These strips are cut by a pattern so that their edges will slightly overlap in the mold. The heavy cast-metal sections B C are then introduced above and below, and the coping or band G is applied before the strips are put in to hold the sections in place. After the insertion of the strips of rubber the mold is subjected to a high pressure under a powerful press, by which process the pieces are pressed together or molded into the form desired, and the whole is then subjected to a steam-heat for the purpose of vulcanizing. If desired, the vulcanizing can be omitted. I thus practically produce the flaring mouth and the body of a cuspidor entire and avoid the well-known objection to the vulcanized-rubber cuspidors, which are composed of two horizontal sections molded or pressed separately, and afterward cemented together at their necks. The coping G is tapering from the top to bottom, and so are the molds—that is, the diameter of both coping and molds is less at the top than bottom—in order that the coping may easily be slipped over the molds and released therefrom. The coping is put on before the strips are inserted.

It will be seen from the above description that I use the strips of rubber or other plastic material in combination with the mold, so that the parts are welded and pressed together, so as to form one single piece or complete cuspidor, and the cementing of the several parts at the joints, as done heretofore, is thereby obviated. The advantage of this construction is that the cuspidors will not part at their necks.

Having described my invention, what I claim as new, and desire to secure by Letters Patent, is—

1. The combination of the sections A A', the inverted cone having flanges which are underscored, and the base-section C, provided with a core or centering-piece, D, substantially as described.

2. The combination of the divisible sections A A', adapted to form in a mold the interior of the body, the neck, and the base or body of a cuspidor, the inverted conical sections, the base-section, with its core or plug D, and the band or coping G, all constructed and adapted to operate substantially as described.

3. The combination of the sections A A', the dowel-and-recess connections thereof, the intermediate apertures, g, the top and bottom sections, B C, and the band or coping G, all constructed and adapted to operate substantially as described.

4. The sections A A', constructed with rabbets and flanges, in combination with the obverse sections B C, having rabbets corresponding to the said sections A A', all constructed and adapted to operate substantially as described.

5. A mold for forming or pressing a cuspidor and other similar articles, consisting of the following parts, to wit: an inverted cone, B, having a neck, B', a base, C, having a core or plug, D, sections A A' and a band or coping, G, all constructed and adapted to operate substantially as described.

6. A cuspidor or other like article which is composed of rubber or other plastic-material strips arranged in a mold condensed and welded by the process of compression in a matrix, substantially as described.

In testimony whereof I affix my signature in presence of two witnesses.

WM. A. KROUSE.

Witnesses:
CLINTON LLOYD,
J. C. HILL.